US009546555B2

(12) United States Patent
Chouhan et al.

(10) Patent No.: US 9,546,555 B2
(45) Date of Patent: Jan. 17, 2017

(54) TAPERED PART-SPAN SHROUD (71) Applicant: General Electric Company, Schenectady, NY (US)

(72) Inventors: Rohit Chouhan, Karnataka (IN); Holly Renae Davis, Greenville, SC (US); Lakshmanan Valliappan, Karnataka (IN)

(73) Assignee: General Electric Company, Schenectady, NY (US)

( * ) Notice: Subject to any disclaimer, the term of this patent is extended or adjusted under 35 U.S.C. 154(b) by 782 days.

(21) Appl. No.: 13/717,265

(22) Filed: Dec. 17, 2012

(65) Prior Publication Data
US 2014/0169974 A1 Jun. 19, 2014

(51) Int. Cl.
F01D 5/22 (2006.01)
F01D 5/16 (2006.01)

(52) U.S. Cl.
CPC ............... F01D 5/225 (2013.01); F01D 5/16 (2013.01); F05D 2260/96 (2013.01); Y02T 50/671 (2013.01); Y02T 50/673 (2013.01)

(58) Field of Classification Search
CPC ............ F01D 5/225; F01D 5/16; F01D 25/06
See application file for complete search history.

(56) References Cited

U.S. PATENT DOCUMENTS 2,472,886 A * 6/1949 Conrad ................. F01D 5/22
416/193 R
2,772,854 A * 12/1956 Anxionnaz ............ F01D 5/22
416/190
3,795,462 A * 3/1974 Trumpler, Jr. ........... F01D 5/22
416/196 R
4,798,519 A * 1/1989 Zipps ................... F01D 5/22
416/190
5,695,323 A * 12/1997 Pfeifer ................. F01D 5/22
416/190
8,105,038 B2 * 1/2012 Ootomo ................ F01D 5/22
416/194

(Continued)

FOREIGN PATENT DOCUMENTS

EP    2 236 755 A2    10/2010
EP    2236755 A2    10/2010
(Continued)

OTHER PUBLICATIONS

European Search cited in European Patent Application No. 13 19 6951 completed Apr. 28, 2014.
(Continued)

Primary Examiner — Craig Kim
Assistant Examiner — Jason Fountain
(74) Attorney, Agent, or Firm — Nixon & Vanderhye P.C.

(57) ABSTRACT

A rotatable blade for use in a turbomachine includes an airfoil portion having a leading edge, a trailing edge a radially-inner end and a radially-outer end; a root section at to the radially-inner end of the airfoil portion, and a part-span shroud located on the airfoil portion between the root section and the radially-outer end. The part-span shroud decreases in width and thickness from decreasing in width and thickness from the airfoil portion to a contact surface adapted to engage a mating contact surface on a part-span shroud of an adjacent blade.

28 Claims, 6 Drawing Sheets (56) References Cited

U.S. PATENT DOCUMENTS

| | | | | |
|---|---|---|---|---|
| 8,118,557 B2* | 2/2012 | DeMania | ............... | F01D 5/141 |
| | | | | 416/191 |
| 8,157,525 B2* | 4/2012 | Brittingham | ............ | F01D 5/189 |
| | | | | 29/889.721 |
| 8,790,082 B2* | 7/2014 | Merrill | ................... | F01D 5/147 |
| | | | | 416/96 R |
| 2009/0047132 A1* | 2/2009 | Riley | ...................... | B23P 6/005 |
| | | | | 416/190 |
| 2010/0092295 A1* | 4/2010 | Riaz | ......................... | F01D 5/14 |
| | | | | 416/189 |
| 2010/0247315 A1 | 9/2010 | DeMania et al. | | |
| 2011/0142650 A1 | 6/2011 | Beeck | | |
| 2011/0194943 A1 | 8/2011 | Mayer et al. | | |

FOREIGN PATENT DOCUMENTS

| | | |
|---|---|---|
| EP | 2 412 930 | 1/2012 |
| EP | 2412930 | 2/2012 |

OTHER PUBLICATIONS

PCT Search Report and Written Opinion issued May 9, 2014 in connection with corresponding EP Patent Application No. 13196951.1.

U.S. Appl. No. 13/691,478, filed Nov. 30, 2012 (pending).

\* cited by examiner

TAPERED PART-SPAN SHROUD

BACKGROUND OF THE INVENTION

The invention relates generally to rotating blades for use in turbomachines. More particularly, the invention relates to a rotating blades provided with part-span shrouds between adjacent blades.

The fluid flow path of a turbomachine such as a steam or gas turbine is generally formed by a stationary casing and a rotor. In this configuration, a number of stationary vanes are attached to the casing in a circumferential array, extending radially inward into the flow path. Similarly, a number of rotating blades are attached to the rotor in a circumferential array and extending radially outward into the flow path. The stationary vanes and rotating blades are arranged in alternating rows so that a row of vanes and the immediate downstream row of blades form a "stage". The vanes serve to direct the flow path so that it enters the downstream row of blades at the correct angle. The airfoil portions of the blades or buckets extract energy from the working fluid, thereby developing the power necessary to drive the rotor and the load attached thereto.

The blades of the turbomachine may be subject to vibration and axial torsion as they rotate at high speeds. To address these issues, blades typically include part-span shrouds disposed on the airfoil portions at an intermediate radial distance between the outer tip and the root section of each blade. The part-span shrouds or shroud portions are typically affixed to each of the pressure (concave) and suction (convex) sides of each airfoil, such that the part-span shrouds on adjacent blades matingly engage and frictionally slide along one another during rotation of the rotor. Conventional part-span shrouds have substantial weight and typically require larger fillets at the shroud/airfoil interface to ease structural stress between the part-span shroud and the airfoil surface, and to support the part-span shroud on the airfoil. The weight and the required fillet design tends to result in less aerodynamic blades, and therefore, in a decrease in flow rate and overall performance of the turbomachine stage at issue.

BRIEF DESCRIPTION OF THE INVENTION

In one exemplary but nonlimiting embodiment, there is provided a rotatable blade for a turbomachine, comprising an airfoil portion having a leading edge and a trailing edge, a radially-inner end and a radially-outer end; a root section at the radially-inner end of the airfoil portion; and a part-span shroud located on the airfoil portion between the root section and the radially outer end, projecting away from opposite sides of the airfoil portion, the part-span shroud decreasing in width and thickness from the airfoil portion to a contact surface adapted to engage a mating contact surface on a part-span shroud of an adjacent blade.

In another exemplary aspect, there is provided a turbomachine comprising: a rotor rotatably mounted within a stator, the rotor including: a shaft; at least one rotor wheel mounted on the shaft, each of the at least one rotor wheels including a plurality of radially outwardly extending blades mounted thereto; and wherein each blade includes an airfoil portion having a leading edge and a trailing edge a radially-inner end and a radially-outer end, a pressure side and a suction side; a root section at the radially-inner end of the airfoil portion; and a pair of part-span shroud portions located on airfoil portion between the root section and the radially outer end, on the pressure side and the suction side, respectively, wherein each part-span shroud portion decreases in width and thickness from the airfoil portion to a contact surface adapted to engage a mating contact surface on a part-span shroud portion of an adjacent blade.

In another exemplary aspect, the invention relates to turbomachine comprising a rotor rotatably mounted within a stator, the rotor including a shaft; at least one rotor wheel mounted on the shaft, each of the at least one rotor wheels including a plurality of radially outwardly extending blades mounted thereto; wherein each blade includes an airfoil portion having a leading edge and a trailing edge a radially-inner end and a radially-outer end, a pressure side and a suction side; a root section at the radially-inner end of said airfoil portion; and a pair of part-span shrouds located on the airfoil portion between the root section and the radially outer end, on the pressure side and the suction side, respectively, wherein each part-span shroud decreases in width and thickness from the airfoil portion to a contact surface adapted to engage a mating contact surface on a part-span shroud of an adjacent blade; wherein the part-span shroud on a pressure side of the airfoil portion has a maximum thickness that is 1.1 to 1.5 times a maximum thickness of the part-span shroud on a suction side of the airfoil portion; and wherein the part-span shroud on the pressure side of the airfoil portion has a length 1.1 to 1.5 times a length of a part-span shroud on the suction side of the airfoil portion.

These and other aspects, advantages and salient features of the invention will become apparent from the following detailed description, in conjunction with the drawings identified below.

It is noted that the drawings of the disclosure are not necessarily to scale. The drawings are intended to depict only typical aspects of the disclosure, and therefore should not be considered as limiting the scope of the disclosure. In addition, the section lines A-A, B-B, C-C are approximations due to the compound angular shapes of the part-span shroud portions.

DETAILED DESCRIPTION OF THE INVENTION

At least one embodiment of the present invention is described below in reference to its application in connection with the operation of an otherwise conventional steam turbine engine. Although embodiments of the invention are illustrated relative to steam and gas turbine engines employed in the production of electricity, it is understood that the teachings are equally applicable to other electric machines including, but not limited to, gas turbine engine compressors, fans and other gas turbines used in aviation. Further, at least one embodiment of the present invention is described below in reference to a nominal size and including a set of nominal dimensions. However, it should be apparent to those skilled in the art that the present invention is likewise applicable to any suitable turbine and/or compressor. Further, it should be apparent to those skilled in the art that the present invention is likewise applicable to various scaled versions of the machines described herein.

Figure 1:
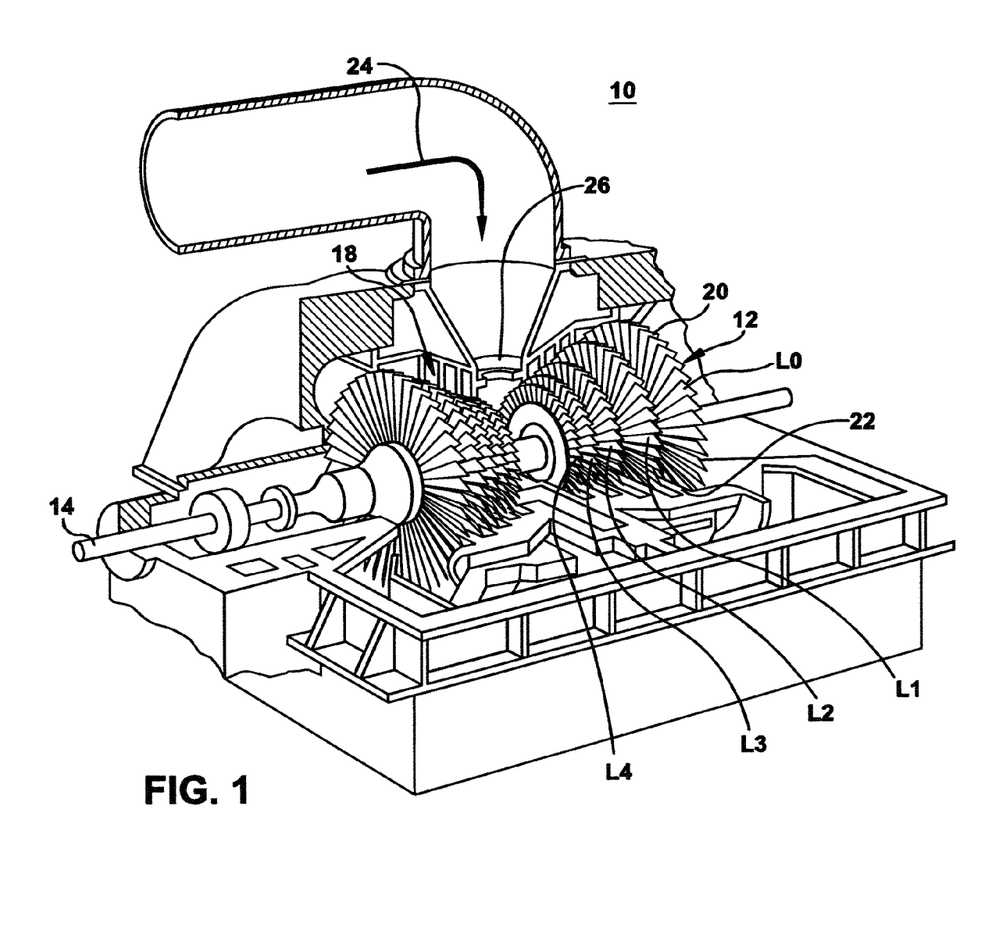
FIG. 1 shows a perspective partial cutaway illustration of a conventional steam turbine.
Figure 2:
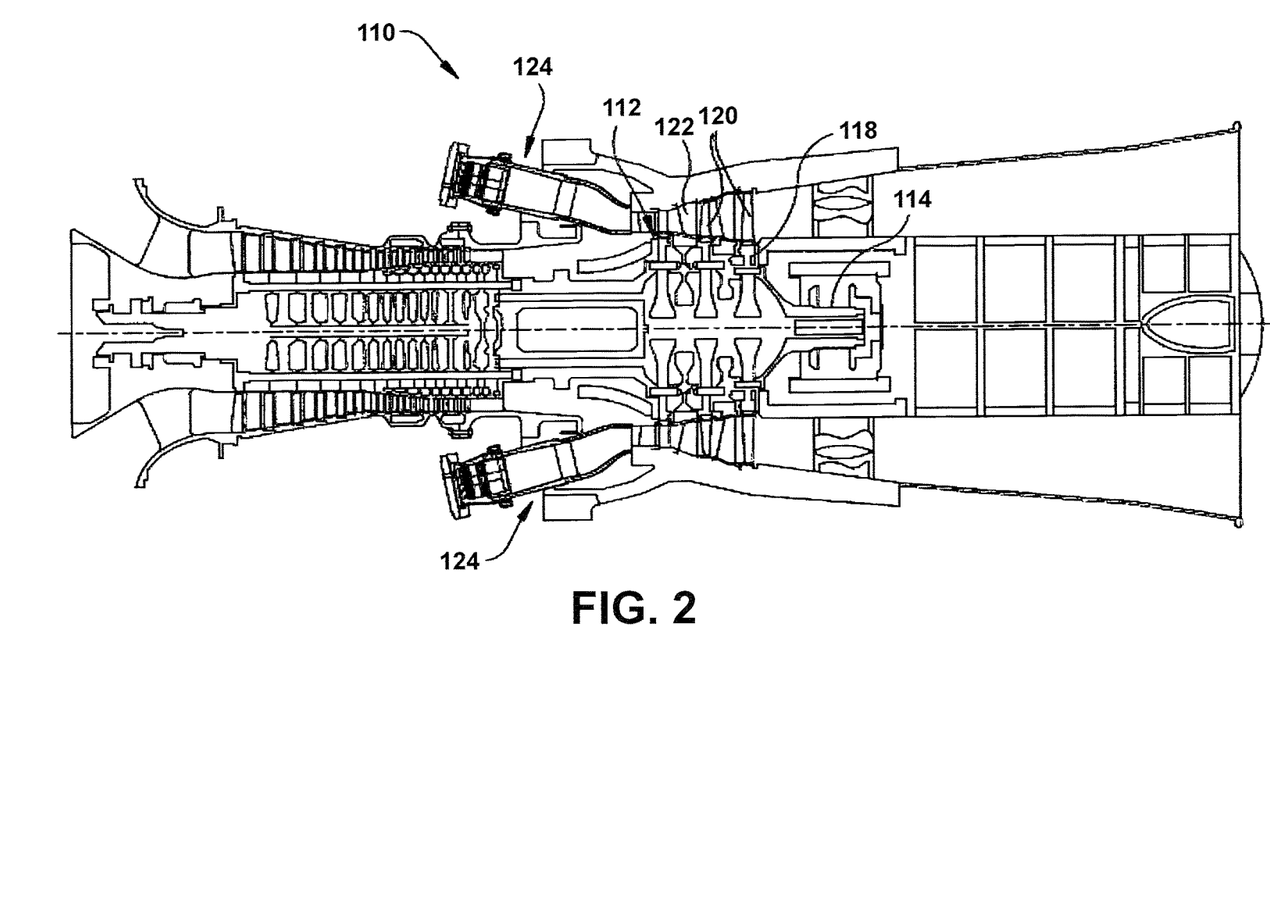
FIG. 2 shows a cross-sectional illustration of a conventional gas turbine.

FIGS. 1-2 illustrate exemplary turbine environments in which blades as described herein might be used. FIG. 1 shows a perspective partial cut-away illustration of a steam turbine 10. The steam turbine 10 includes a rotor 12 that includes a shaft 14 and a plurality of axially spaced rotor wheels 18. A plurality of rotatable blades 20 are mechanically coupled to each rotor wheel 18. More specifically, blades 20 are arranged in rows that extend circumferentially around each rotor wheel 18. A plurality of stationary vanes 22 extends circumferentially around the shaft 14 and are axially positioned between adjacent rows of blades 20. The stationary vanes 22 cooperate with the rotatable blades 20 to form one of a plurality of turbine stages, and to define a portion of a steam flow path through turbine 10.

In operation, steam 24 enters an inlet 26 of turbine 10 and is channeled through stationary vanes 22. Vanes 22 direct the steam 24 downstream against the blades 20. The steam 24 passes through the remaining stages, imparting a force on blades 20 causing shaft 14 to rotate. At least one end of turbine 10 may extend axially away from rotor 12 via shaft 14 and may be attached to a load or machinery (not shown) such as, but not limited to, a generator, and/or another turbine. Accordingly, a large steam turbine unit may actually include several turbines that are all co-axially coupled to the same shaft 14. Such a unit may, for example, include a high pressure turbine coupled to an intermediate-pressure turbine, which is in turn coupled to a low pressure turbine.

The steam turbine 10 shown in FIG. 1, comprises five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that more or fewer than five stages may be present.

With reference to FIG. 2, a cross-sectional illustration of a gas turbine 110 is shown. The gas turbine 110 includes a rotor 112 that includes a shaft 114 and a plurality of axially spaced rotor wheels 118. In some embodiments, each rotor wheel 118 may be made of metal such as, for example, steel. A plurality of rotating blades 120 are mechanically coupled to each rotor wheel 118. More specifically, blades 120 are arranged in rows that extend circumferentially around each rotor wheel 118. A plurality of stationary vanes 122 extend circumferentially around shaft 114 and are axially positioned between adjacent rows of blades 120.

During operation, air at atmospheric pressure is compressed by a compressor and delivered to a combustion stage. In the combustion stage, the air leaving the compressor is heated by adding fuel to the air and burning the resulting air/fuel mixture. The gas flow resulting from combustion of fuel in the combustion stage then expands through the turbine 110, delivering some of its energy to drive the turbine 110 and produce mechanical power. To produce driving torque, turbine 110 consists of one or more stages. Each stage includes a row of vanes 122 and a row of rotating blades 120 mounted on a rotor wheel 118. Vanes 122 direct incoming gas from the combustion stage onto blades 120. This drives rotation of the rotor wheel 118, and as a result, shaft 114, producing mechanical power.

Figure 3:
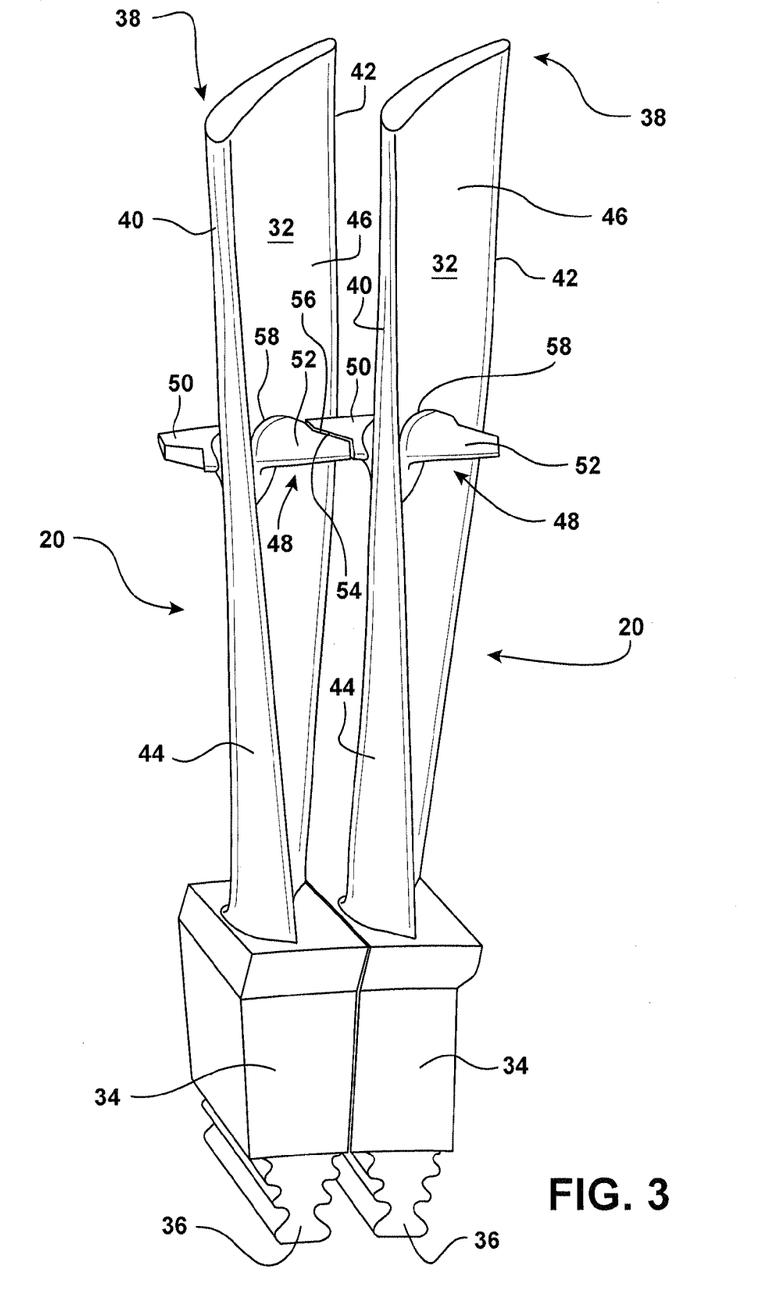
FIG. 3 shows a perspective illustration of two adjacent rotating blades according to an exemplary but nonlimiting embodiment.
Figures 4, 5, 6, 7:
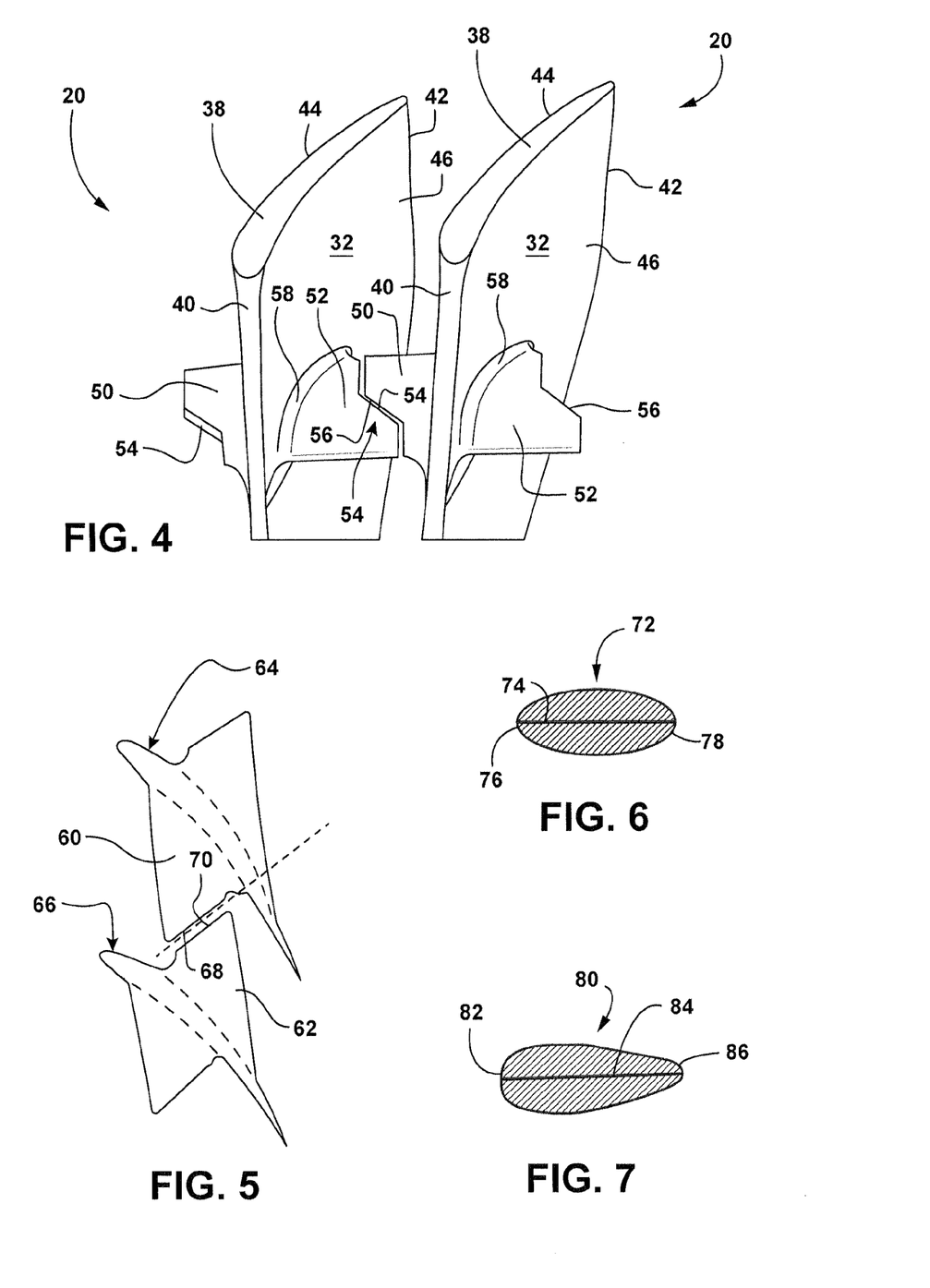
FIG. 4 shows an enlarged perspective illustration of a portion of two adjacent rotating blades including part-span shrouds taken from FIG. 3.
FIG. 5 shows a top view of a portion of two adjacent blades including part-span shrouds according to another exemplary embodiment of the invention.
FIG. 6 is a cross-section of a known, symmetrical part-span shroud.
FIG. 7 is a cross-section of a tear-drop shaped part-span shroud.

The following description specifically references blade 20, but is equally applicable to the blade 120. Turning to FIGS. 3 and 4, a pair of adjacent blades 20 is shown in greater detail. Each blade 20 includes an airfoil portion 32. A root section 34 is affixed to (or integral with) a radially-inward end of the airfoil portion 32. A blade attachment member 36 projects from the root section 34. In some embodiments, blade attachment member 36 may be a dovetail, but other blade attachment member shapes and configurations are well known in the art and are also contemplated herein. At a second, opposite end of airfoil portion 32 is a radially-outer tip 38. The airfoil configuration is formed to include a leading edge 40, a trailing edge 42, a pressure side 44 and a suction side 46.

A part-span shroud 48 is attached at an intermediate section of the airfoil portion 32 between the root section 34 and the tip 38. In the exemplary embodiment, part-span shroud portions 50, 52 are located, respectively, on the suction side 44 and pressure side 46 of the airfoil portion 32. In the exemplary embodiment illustrated in FIG. 3, the part-span shroud portions 50, 52 of adjacent blades 20 are designed to at least partially engage along mated Z-shaped contact surfaces 54, 56 (see FIG. 4) during operation of the turbine. The part-span shroud portions are joined to the airfoil portion at fillets 58 (shown for part-span shroud portions 52 but also employed with part-span shroud portions 50).

The blade stiffness and damping characteristics are improved as the part-span shrouds contact each other along contact surfaces 54, 56 during untwisting of the blade. The plurality of blades 20 thus behave as a single, continuously coupled structure that exhibits improved stiffness and dampening characteristics (and thus reduced vibrating stresses) when compared to a discrete and uncoupled design.

FIG. 5 illustrates another known configuration where part-span shroud portions 60, 62 on adjacent, respective blades 64, 66 are designed to engage along straight, substantially-parallel contact surfaces 68, 70.

FIG. 6 illustrates a known, symmetrical cross-sectional shape for a part-span 72 shroud (on both the pressure and suction sides of the airfoil), as shown and described, for example, in U.S. Pat. No. 5,695,323, and typically used with shroud configurations as shown in FIGS. 3-5. Note that the maximum thickness of the part-span cross-section is located approximately midway along the length of a chord 74 extending between the leading and trailing edges 76, 78 of the part-span shroud 72.

FIG. 7 illustrates a tear-drop cross-sectional shape for a part-span shroud 80. Here, the maximum thickness of the cross-sectional shape has been moved forward, nearer to the leading edge 82 of the part-span shroud. More specifically, the point of maximum thickness may be located in a range of 20 to 40%, and preferably about 30% of the length of a chord 84 extending between the leading and trailing edges 82, 86 respectively, of the part-span shroud 80, as measured from the leading edge 82. Thus, the thickness of this tear-drop shaped part-span shroud varies in opposite directions from the location of maximum thickness.

Figure 8:
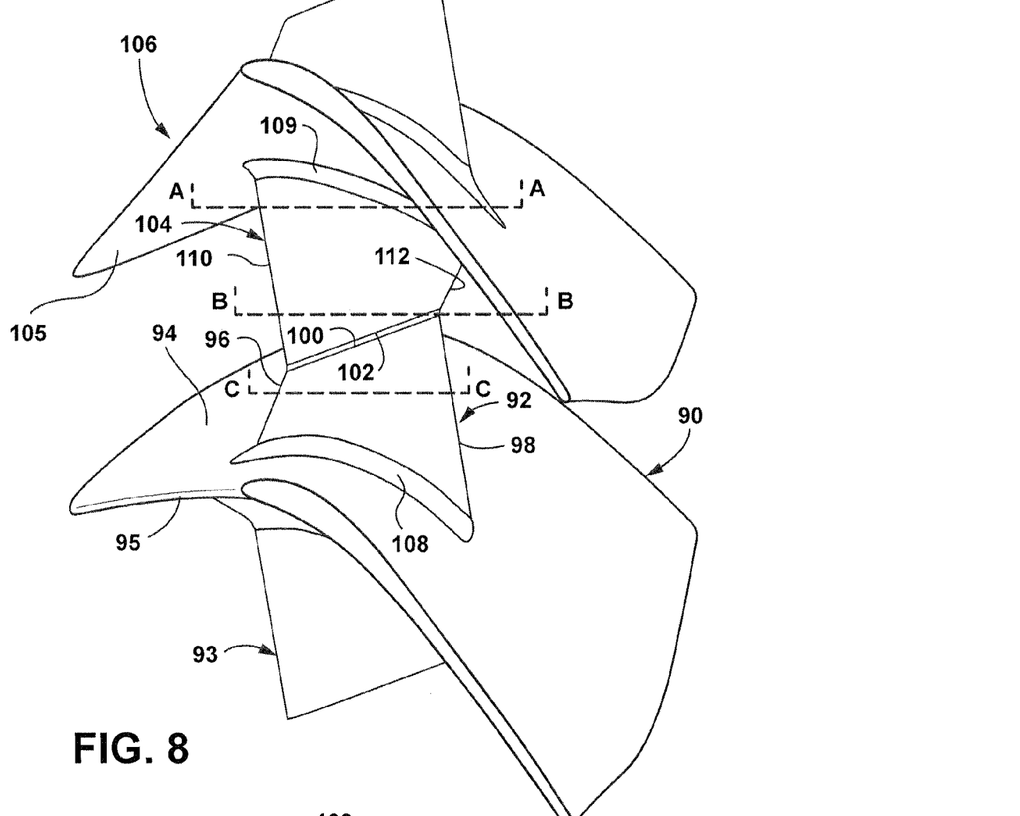
FIG. 8 is a top view similar to FIG. 5 but illustrating mating part-span shrouds of adjacent blades in accordance with an exemplary but nonlimiting embodiment of the invention.
Figure 9:
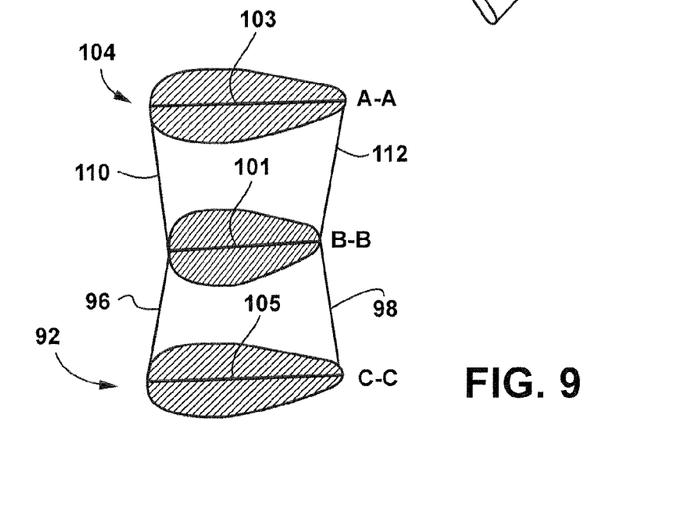
FIG. 9 is a schematic view of the various cross-sections A-A, B-B and C-C in FIG. 8, illustrating area differentials at the various sections of the mating part-span shrouds.

FIGS. 8 and 9 illustrate a tapered part-span shrouds (or part-span shroud portions) on adjacent blades of a rotor wheel in accordance with an exemplary but nonlimiting embodiment of this invention. One blade or bucket 90 (in a steam or gas turbine) is provided with a part-span shroud (PSS) portion 92 on the suction side 94 of the blade. The PSS portion 92 is comprised of three edges, a leading edge 96, a trailing edge 98 and a connecting edge 100. The connecting edge 100 may also be referred to as a contact surface which is adapted to engage or abut a similar contact surface 102 of an adjacent PSS portion 104 of an adjacent pressure side 105 of the blade or bucket 106. The trailing edge 98 and contact surface 100 intersect at a first angle of about 90°, while the leading edge 96 tapers from the blade interface (as defined by the fillet 108 to the contact surface 100, thus intersecting the connecting edge at a second obtuse angle of greater than about 90°. The particular angles may vary with specific applications based on turbine frame size, turbine stage, etc.

A substantially-opposite or mirror-image taper configuration is provided in the PSS portion 93 on the pressure side 95 of the blade 90, which is identical to the part-span shroud portion 104 on the pressure side 105 of the adjacent blade 106. Here, the leading edge 110 and the contact surface 102 intersect at a first angle of about 90°, while the trailing edge 112 tapers from the blade interface (represented by fillet 109) to the contact surface 102, thus intersecting the contact surface 102 at a second angle of greater than 90°.

By tapering the leading and trailing edges 96, 98, 110 and 112, respectively, in a circumferential or blade-to-blade direction (inwardly toward the respective contact edges 100, 102), it can be seen that the mass or weight of the part-span shroud portions is reduced, and the contact surfaces 100, 102 engage along a substantially straight line of reduced length.

This feature is also illustrated in FIG. 8 where it is shown that the tear-drop shaped cross-sectional profiles (taken at the approximate locations of section lines A-A, B-B and C-C in FIG. 8) remain substantially similar but with a mass or weight reduction at the section line B-B which is located proximate the engaged contact surfaces 100, 102. In other words, while the cross-sectional shape and maximum thickness of the variously-located sections remain substantially the same, the length of the chord 101 from the leading edge to the trailing edge (proximate the contact surfaces 100, 102) is decreased relative to chords 103, 105, thus reducing the contact surface areas. This reduced chord length reflects the sharp taper along edges 96, 112 in the blade-to-blade direction.

Figure 10:
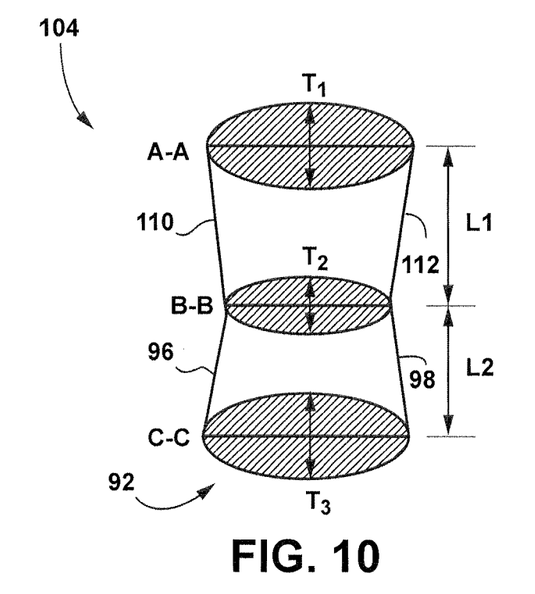
FIG. 10 is a schematic view similar to FIG. 9 but in accordance with another exemplary embodiment.

FIG. 10 illustrates an embodiment similar to FIG. 9 in terms of chord length variation, but wherein the cross-sectional profiles are essentially symmetrical oval shapes as opposed to the tear-drop shapes in FIG. 9. In addition, note that the maximum cross-sectional thickness T2 is decreased along and/or adjacent the contact surfaces (at or near section B-B) as compared to thicknesses T2 and T3 substantially along sections A-A and C-C. As a result, both the chord length and the maximum thickness are decreased at this location, thus producing an even further reduction in mass of the shroud portions. Since the only difference between FIGS. 9 and 10 relate to profile shape, identical reference numbers have been used.

Figure 11:
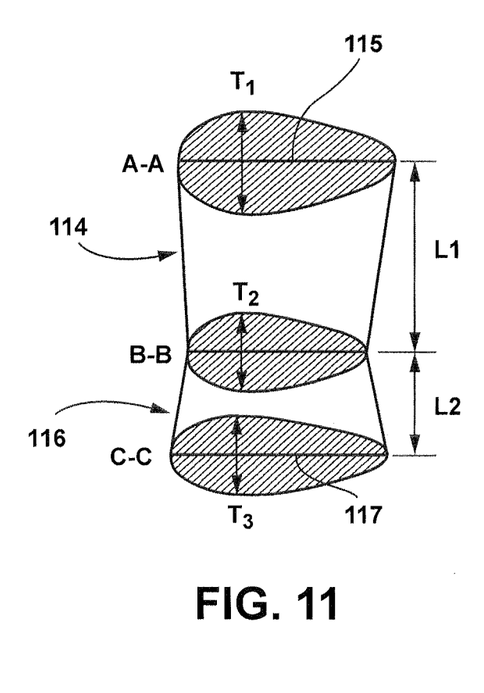
FIG. 11 is a schematic view similar to FIG. 10 but illustrating cross-sectional shapes of mating part-span shrouds in accordance with another exemplary embodiment.

In FIG. 11, the mating PSS portions 114 and 116 have a generally airfoil- or tear-drop shaped cross-section or profile. In this embodiment, the maximum thickness T1 and chord length 115 are greatest at the attachment location of the PSS portion 114 (substantially along section A-A) on the pressure side of the blade. Where the PSS portion 116 attaches to the suction side (represented by section C-C), the chord length 117 and maximum thickness T3 are both greater than at the contact surfaces (represented by section B-B) but less than at the pressure side attachment (represented at section A-A). In addition, the length L1 of the PSS 114 is greater than the length L2 of the PSS 116. Note, however, that the cross-sectional shape or profile of the mated PSS portions remains generally similar.

The longer PSS portion 114 extending from the pressure side of the blade leads to a higher mass than the adjacent and shorter PSS portion 116, and therefore a higher centrifugal force (or pull load) during operation. With a higher pull load, the cross-sectional area at the attachment to the pressure surface must be increased with or without a concurrent increase in the size of the fillet. On the other hand, because of the lesser length for PSS portion 116, both the cross-section and fillet size can be decreased. Of course, the shape and thickness at the facing or contact surfaces (represented by section B-B) edges should be identical to facilitate a substantially perfectly-matched contact interface.

In an exemplary but nonlimiting embodiment, the thickness T1 at section A-A on the pressure side may be 10-50% (or 1.1 to 0.5 times) greater than at section CC on the suction side. Similarly, the length L1 of the PSS portion 114 may be 10-50% (or 1.1 to 1.5 times) greater than L2 of the PSS portion 116.

By having a reduced-size profile and fillet at the suction side interface, overall flow performance can be improved.

In addition, the contact surfaces need not define a simple, straight line but may have other configurations as well, for example, a conventional Z-lock shape.

The blades and part-span shrouds described above may be used in a variety of turbomachine environments. For example, the blades having part-span shrouds may operate in any one or more of: a front stage of a compressor, a latter stage in a gas turbine, a low pressure section blade in a steam turbine, a front stage of compressor, and a latter stage of turbine for aviation gas turbine.

As used herein, the modifier "about" used in connection with an angle or dimension is inclusive of the stated value and has the meaning dictated by the context (e.g., includes the degree of error associated with measurement of the particular angle or dimension).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A rotatable blade for a turbomachine, comprising:
an airfoil portion having an airfoil leading edge and an airfoil trailing edge, a radially-inner end and a radially-outer end;
a root section at the radially-inner end of the airfoil portion;
a first part-span shroud located on the airfoil portion between the root section and the radially-outer end, projecting away from a first side of said airfoil portion and terminating at a first contact surface, said first part-span shroud being tapered to decrease in width and in thickness from the airfoil portion to the first contact surface, a ratio between a maximum width and a maximum thickness of the first part-span shroud being consistent throughout the first part-span shroud; and
a second part-span shroud located on the airfoil portion between the root section and the radially-outer end, projecting away from a second side of said airfoil portion opposite the first side of said airfoil portion and terminating at a second contact surface,
wherein said second part-span shroud is tapered to decrease in width and in thickness from the airfoil portion to the second contact surface, and wherein a ratio between a maximum width and a maximum thickness of the second part-span shroud is consistent throughout the second part-span shroud,
wherein the first side of the airfoil portion is a pressure side of the airfoil portion and the second side of the airfoil portion is a suction side of the airfoil portion, and
wherein the maximum thickness of the first part-span shroud at the pressure side of the airfoil portion is 1.1 to 1.5 times the maximum thickness of the second part-span shroud at the suction side of the airfoil portion.

2. The rotatable blade of claim 1, wherein said first and second part-span shrouds are substantially equal in length.

3. The rotatable blade of claim 1, wherein said first and second part-span shrouds have different lengths.

4. The rotating blade of claim 1, wherein said first and second part-span shrouds have symmetrical cross-sectional shapes.

5. The rotatable blade of claim 1, wherein the roatatable blade operates as one of: a front stage blade in a compressor, a latter stage blade in a gas turbine, or a low pressure section blade in a steam turbine.

6. The rotatable blade of claim 1, wherein a length of the first part-span shroud at the pressure side of the airfoil portion is 1.1 to 1.5 times a length of the second part-span shroud at the suction side of the airfoil portion.

7. The rotatable blade of claim 1, wherein the first part-span shroud has the same cross-sectional shape at the airfoil portion and at the first contact surface, and wherein the cross-sectional shape of the first part-span shroud at the first contact surface is smaller than the cross-sectional shape of the first part-span shroud at the airfoil portion.

8. The rotatable blade of claim 1, wherein the second part-span shroud has the same cross-sectional shape at the airfoil portion and at the second contact surface, and wherein the cross-sectional shape of the second part-span shroud at the second contact surface is smaller than the cross-sectional shape of the second part-span shroud at the airfoil portion.

9. The rotatable blade of claim 1, wherein the first and second part-span shrouds are configured to engage respective mating contact surfaces on part-span shrouds of adjacent blades.

10. The rotatable blade of claim 1, wherein each of the first and second part-span shrouds respectively having a generally tear drop shape in cross section from a shroud leading edge to a shroud trailing edge with the maximum thickness of the part-span shroud being forward of a midpoint of a chord connecting the shroud leading edge and the shroud trailing edge.

11. The rotatable blade of claim 1, wherein the first part-span shroud comprises:
a first intersection between a first edge projecting from the airfoil portion and a first end of the first contact surface, the first intersection being at about a 90 degree angle; and
a second intersection between a second edge projecting from the airfoil portion and a second end of the first contact surface, the second intersection being at an angle greater than about 90 degrees.

12. The rotatable blade of claim 11, wherein the second part-span shroud comprises:
a first intersection between a first edge projecting from the airfoil portion and a first end of the second contact surface, the first intersection being at about a 90 degree angle; and
a second intersection between a second edge projecting from the airfoil portion and a second end of the second contact surface, the second intersection being at an angle greater than about 90 degrees.

13. A turbomachine comprising:
a rotor rotatably mounted within a stator, the rotor including:
a shaft; and
at least one rotor wheel mounted on the shaft, each of the at least one rotor wheels including a plurality of radially outwardly extending blades mounted thereto,
wherein each blade includes an airfoil portion having a leading edge and a trailing edge, a radially-inner end and a radially-outer end, a pressure side and a suction side, a root section at the radially-inner end of said airfoil portion, and a pair of part-span shroud portions located on said airfoil portion between said root section and said radially-outer end on said pressure side and said suction side, respectively,
wherein each part-span shroud portion is tapered to decrease in width and in thickness from the airfoil portion to a contact surface adapted to engage a mating contact surface on an opposed part-span shroud portion of an adjacent blade,
wherein for each part-span shroud portion, a ratio between a maximum width and a maximum thickness of the part-span shroud portion is consistent throughout the part-span shroud portion, and
wherein the maximum thickness of said pressure side part-span shroud portion at the pressure side of the airfoil portion is 1.1 to 1.5 times the maximum thickness of the suction side part-span shroud portion at the suction side of the airfoil portion.

14. The turbomachine of claim 13, wherein said part-span shroud portions are substantially equal in length.

15. The turbomachine of claim 13, wherein said part-span shroud portions have different lengths.

16. The turbomachine of claim 15 wherein said pressure side part-span shroud portion has a length that is 1.1 to 1.5 times a length of the suction side part-span shroud portion.

17. The turbomachine of claim 13, wherein said part-span portions have symmetrical cross-sectional shapes.

18. The turbomachine of claim 13, wherein each blade operates as one of: a front stage blade in a compressor, a latter stage blade in a gas turbine, or a low pressure section blade in a steam turbine.

19. The turbomachine of claim 13, wherein each part-span shroud portion has a generally tear drop shape in cross section from a shroud leading edge to a shroud trailing edge with the maximum thickness being forward of a midpoint of a chord connecting the shroud leading edge and the shroud trailing edge.

20. The turbomachine of claim 13, wherein each part-span shroud portion comprises:
 a first intersection between a first edge projecting from the airfoil portion and a first end of the contact surface, the first intersection being at about a 90 degree angle; and
 a second intersection between a second edge projecting from the airfoil portion and a second end of the contact surface, the second intersection being at an angle greater than about 90 degrees.

21. The turbomachine of claim 13, wherein when the part-span shroud portion contacts the opposed part-span shroud portion, the part-span shroud portions form a continuous structure, a cross-sectional shape of the continuous structure having a maximum thickness that is largest when the cross-section is taken at the respective airfoil portions and smallest when the cross-section is taken where the part-span shroud portions engage each other.

22. A turbomachine comprising: a rotor rotatably mounted within a stator, the rotor including:
 a shaft;
 at least one rotor wheel mounted on the shaft, each of the at least one rotor wheels including a plurality of radially outwardly extending blades mounted thereto, wherein each blade includes an airfoil portion having a leading edge and a trailing edge, a radially-inner end and a radially-outer end, a pressure side and a suction side;
 a root section at the radially-inner end of said airfoil portion; and
 a pair of part-span shrouds located on said airfoil portion between said root section and said radially-outer end, on said pressure side and said suction side, respectively, wherein each part-span shroud is tapered to decrease in width and in thickness from the airfoil portion to a contact surface adapted to engage a mating contact surface on a part-span shroud of an adjacent blade,
 wherein for each part-span shroud, a ratio between a maximum width and a maximum thickness of the part-span shroud is consistent throughout the part-span shroud, and
 wherein the maximum thickness of said pressure side part-span shroud at the pressure side of the airfoil portion is 1.1 to 1.5 times the maximum thickness of the suction side part-span shroud at the suction side of the airfoil portion, and
 wherein said pressure side part-span shroud has a length at the pressure side of the airfoil portion that is 1.1 to 1.5 times a length of the suction side part-span shroud on the suction side of the airfoil portion.

23. The turbomachine of claim 22, wherein said part-span shrouds on respective pressure and suction sides of adjacent ones of said blades at least partially engage along adjacent, substantially Z-shaped edges.

24. The turbomachine of claim 22, wherein said part-span shrouds on respective pressure and suction sides of adjacent ones of said blades have substantially-parallel facing edges.

25. The turbomachine of claim 22, wherein each part-span shroud has a generally tear drop shape in cross section from a shroud leading edge to a shroud trailing edge with the maximum shroud thickness being forward of a midpoint of a chord connecting the shroud leading edge and the shroud trailing edge.

26. The turbomachine of claim 22, wherein each part-span shroud comprises:
 a first intersection between a first edge projecting from the airfoil portion and a first end of the contact surface, the first intersection being at about a 90 degree angle; and
 a second intersection between a second edge projecting from the airfoil portion and a second end of the contact surface, the second intersection being at an angle greater than about 90 degrees.

27. The turbomachine of claim 22, wherein when one of the part-span shrouds on the blade contacts the part-span shroud of the adjacent blade, the contacting part-span shrouds form a continuous structure, a cross-sectional shape of the continuous structure having a maximum thickness that is largest when the cross-section is taken at the blade and at the adjacent blade and is smallest when the cross-section is taken where the contacting part-span shrouds engage each other.

28. A rotatable blade for a turbomachine, comprising:
 an airfoil portion having an airfoil leading edge and an airfoil trailing edge, a radially-inner end and a radially-outer end;
 a root section at the radially-inner end of the airfoil portion; and
 a part-span shroud located on the airfoil portion between the root section and the radially-outer end, projecting away from opposite sides of said airfoil portion and terminating at respective contact surfaces, at least said part-span shroud having a generally tear drop shape in cross section from a shroud leading edge to a shroud trailing edge with a maximum shroud thickness forward of a midpoint of a chord connecting the shroud leading edge and the shroud trailing edge,
 wherein said part-span shroud is tapered to decrease in width and in thickness from the airfoil portion to the respective contact surfaces, a ratio between a maximum width and a maximum thickness of the part-span shroud being consistent throughout the part-span shroud and
 wherein the maximum thickness of the part-span shroud at one side of the airfoil portion is 1.1 to 1.5 times the maximum thickness of the part-span shroud at the other side of the airfoil portion.

* * * * *

UNITED STATES PATENT AND TRADEMARK OFFICE
CERTIFICATE OF CORRECTION

PATENT NO. : 9,546,555 B2  
APPLICATION NO. : 13/717265  
DATED : January 17, 2017  
INVENTOR(S) : Chouhan et al.

Page 1 of 1

It is certified that error appears in the above-identified patent and that said Letters Patent is hereby corrected as shown below:

In the Claims

In Claim 5 at Column 7, Line 44, change "roatatable" to --rotatable--

In Claim 28 at Column 10, Line 53, change "shroud and" to --shroud, and--

Signed and Sealed this  
Eleventh Day of April, 2017

Michelle K. Lee  
*Director of the United States Patent and Trademark Office*